United States Patent
de Musquiz Reumert et al.

[15] 3,666,749
[45] May 30, 1972

[54] IRON DEXTRAN COMPLEX AND PROCESS FOR MAKING SAME

[72] Inventors: Jorgen de Musquiz Reumert, Gentofte; Ole Gylling-Pedersen; Jose Bou Casals, both of Roskilde, all of Denmark

[73] Assignee: Aktieselskabet Rosco, Taastrupgardsveg, Taastrup, Denmark

[22] Filed: Sept. 15, 1969

[21] Appl. No.: 858,105

Related U.S. Application Data

[63] Continuation-in-part of Ser. No. 502,485, Oct. 22, 1965, abandoned.

[30] Foreign Application Priority Data

Dec. 29, 1964   Denmark ................................. 6403/64

[52] U.S. Cl. .......................................... 260/209 D, 424/180
[51] Int. Cl. ........................................................ C07c 47/18
[58] Field of Search .................................................. 260/209 D

[56] References Cited

UNITED STATES PATENTS

| | | | |
|---|---|---|---|
| R24,642 | 4/1959 | London et al. | 260/209 D |
| 2,885,393 | 5/1959 | Herb | 260/209 D |
| 3,093,545 | 6/1963 | Westfall et al. | 260/209 D |

*Primary Examiner*—Lewis Gotts
*Assistant Examiner*—Johnnie R. Brown
*Attorney*—Synnestvedt & Lechner

[57] ABSTRACT

A method of making iron dextran complexes wherein ferric hydroxide is reacted with dextran or dextran glucosides, precipitating iron dextran into at least two fractions having different iron contents and subjecting one of the fractions of the iron dextran formed in the first complexing step to a second complexing step and precipitating the iron dextran into at least two fractions having different iron contents, separating and recovering the fraction having the higher iron content and recycling the fraction having the lower iron content.

9 Claims, No Drawings

IRON DEXTRAN COMPLEX AND PROCESS FOR MAKING SAME

This application is a continuation-in-part of our U.S. Pat. application, Ser. No. 502,485 filed Oct. 22, 1965 and now abandoned.

The present invention relates to the manufacture of compositions comprising a substantially nonionic complex of ferric hydroxide with a dextran.

Preparations for injection of aqueous solutions of complexes of ferric hydroxide with a dextran have been extensively used in prophylactic and therapeutic treatment of iron-deficiency anaemia. Several processes are known for producing such complexes, all being based on the reaction of ferric hydroxide with a dextran.

Dextran is a polysaccharide with the empirical formula $(C_6H_{10}O)_n$ and it is built up of glucose units being linked together mainly through alpha-1.6-glucosidic bindings and to a considerably less extent through alpha-1.4-glucosidic bindings.

In the known processes for producing the complexes which may be called iron dextran complexes, partially depolymerized dextran or raw dextran with a relatively small average molecular weight and a ferric compound are used as starting material. In addition thereto use is made of a base.

Thus, a process is known in which partially depolymerized dextran is added to a solution or a suspension of a ferric compound whereafter a base is added for the formation of ferric hydroxide, or the dextran is dissolved in alkali whereafter the solution or the suspension of the ferric compound is added and the ferric compound is converted into ferric hydroxide. It is preferred to add a solution of the base to an aqueous solution of the dextran and thereafter to add an aqueous solution or suspension of the ferric compound. In the said process the reaction or combination of ferric hydroxide and dextran is carried out at a temperature between room temperature and the boiling point of the solution, and the operation takes place at a pH-value within the basic range. A dextran having an intrinsic viscosity within the range of 0.025 to 0.5, particularly 0.03 to 0.06, is used. After purification of the prepared product iron preparations being isotonic with the blood fluids can be produced. A process of this kind is described in the British Pat. specification, No. 748,024 and the US Pat. specification Re 24,642.

According to another known process a dextran decomposition product having a molecular weight within the range of about 30,000 to 80,000 is used as starting material. Also in this case there is in addition to the two reactants, dextran and ferric compound made use of a base to form ferric hydroxide, and the reactants may be added to each other in any sequence. If the dextran is added to a ferric salt solution prior to the addition of the base, it is not necessary to control the addition of the base. If, on the contrary, the base is added to the ferric salt solution before the dextran is added, the pH-value should be adjusted to at least about 2.0, preferably to about 2.3. After the complexing reaction, which can be accelerated by heating, the complex may be isolated and purified by repeated precipitations and re-dissolving in water. It is preferred to heat the complex to partially depolymerize the dextran, and the solution is made alkaline and is heated again, which causes all unreacted iron to be taken up by the dextran. Thereafter the solution is neutralized and the complex of ferric hydroxide with dextran is isolated. The isolated complex, which may show an iron content within the range of 18 percent to about 27 percent by weight, is then dissolved in water to form a solution which can be brought to any desired concentration and which is made isotonic with the blood fluids. It is, however, not possible to have the iron content exceed 7 percent. A process of this kind is described in U.S. Pat. specification, No. 2,885,393.

Further, it is known to prepare an injectable iron dextran complex by heating a dextran glucoside having an average molecular weight of 500 to 80,000 and a ferric salt to a temperature between 100° and 120° C in the presence of an alkali hydroxide. The resultant reaction product between ferric hydroxide and the dextran glucoside is purified and dried, if desired, whereafter a solution being isotonic with the blood fluids can be prepared.

There is also known a process according to which a complex of ferric hydroxide with dextran is produced from raw dextran having an intrinsic viscosity at 25° C between 0.25 and 0.75, by heating a solution or a suspension of the raw dextran with a solution of an acid ferric salt until the intrinsic viscosity of the dextran is not more than 0.1 at 25° C, whereafter the said mixture is treated with aqueous alkali hydroxide. Then the resultant complex is isolated or purified in the usual manner. The purified complex contains 22 to 27 percent of iron by weight. From the complex it is possible to prepare sterile solutions being isotonic with the blood. This process is described in the German Pat. specification, No. 1,172,250.

Finally, it is known to produce a complex of ferric hydroxide with dextran by adding to an acidic solution of water-soluble dextran and a water-soluble iron compound an aqueous solution of an alkali metal carbonate or bicarbonate, subsequently adding an alkali metal hydroxide to form a suspension, heating said suspension to form a solution and neutralizing the solution to obtain a complex of ferric hydroxide with dextran, said complex containing about 33% Fe by weight and showing a ratio of 2 moles of iron to each anhydroglucose unit. This process is described in the Swiss Pat. specification, No. 370,194.

The present invention relates to a process by which it is possible not only to arrive at iron dextran complexes with a high ferric content and even a higher one than hitherto known, but also to obtain an improved utilization of the dextran compound used as starting material. An improved utilization of the employed amount of dextran compound is of economical importance and results in final products with a more favorable ratio of iron to dextran compound.

In the known processes a freshly prepared solution of ferric hydroxide or a solution of ferric hydroxide formed in situ is reacted with a dextran solution to form the complex of ferric hydroxide with dextran, and the said complex is isolated by precipitation with a water-miscible solvent, such as methyl alcohol, ethyl alcohol or acetone, and sometimes purified by redissolution in water and reprecipitation.

The principal feature of the process of the present invention comprises fractional precipitation of the formed complex of ferric hydroxide with a dextran compound to form at least two fractions showing different iron contents and utilization of one of these fractions as starting material instead of the dextran compound for reaction with ferric hydroxide to form a complex of ferric hydroxide with the fraction used instead of the dextran compound. In other words, the process of the invention comprises a recycling step, and this recycling step makes an improved utilization of the dextran compound possible whereas it will also become possible to produce iron dextran complexes showing a higher iron content than those hitherto known.

By the process of the invention it is possible to arrive at iron dextran complexes having an iron content up to about 42 percent of the dry weight, and from the said complexes it is possible to prepare injectable solutions having an iron content of 12 percent, and such solutions show a low viscosity and $LD_{50}$-values between 750 mg and 1,300 mg of iron per kilogram of the weight of the body when injected intravenously in mice. This has been confirmed by the pharmacological testings on sucking pigs during which no cases of death due to the said ferric dextran preparation have been encountered.

When in the first step of our process the complexing reaction takes place between ferric hydroxide in solution and the dextran compound in solution, the dextran compound should show an intrinsic viscosity within the range of about 0.0025 and about 0.25 at 25° C. When however, the said first complexing step is carried out under such conditions that also a material depolymerization of the dextran compound is obtained, it is possible to use as starting material dextran compounds having an intrinsic viscosity up to 0.75 at 25° C. The intrinsic viscosity of the dextran compounds being used as starting material should not be below 0.025 at 25° C since lower values do not yield satisfactory products.

The dextran compounds used in the first step of our process is dextran or dextran glucosides which have the desired intrinsic viscosity. Both such dextran and such dextran glucosides are known in the art. With respect to dextran glucosides particular reference is made to US Pat. specification, No. 2,929,764, and among the dextran glucosides described therein it is preferred to use dextran glycerol glucoside.

The ferric hydroxide used in our process may be formed from any water-soluble ferric salt which together with a base in the presence of dextran forms ferric hydroxide, or use may be made of mixtures of such ferric salts. It does not greatly matter which anion forms part of the said salts since the anion does not partake in the reaction. Examples of such salts are ferric chloride, ferric nitrate, ferric sulfate, ferric acetate, ferric trichloro acetate, ferric citrate and double salts, such as ferric ammonium sulfate and ferric hydroxy salts. Freshly prepared ferric hydroxide may also be used.

The basic-reacting compound to create the formation of the ferric hydroxide may be an alkali metal hydroxide, alkali metal carbonate or bicarbeonate, ammonium hydroxide, ammonium carbonate or bicarbonate, or tetramethyl ammonium hydroxide. The amount of base to be added depends on the complexing conditions used, and the preferred base depends on the ferric salt used. It is known in the art how to form the ferric hydroxide for complexing with dextran.

The ratio between the dextran or ferric dextran compound used in the complexing reaction and the ferric compound may be of importance for achieving the desired product. When e.g., dextran glycerol glucoside is used as dextran starting compound, the said ratio should e.g., be between about 1.1 and about 4 moles of anhydroglucose units ($C_6H_{10}O_5$) in the dextran compound per mole of iron. It is preferred not to use more than about 2 moles of glucose units in the dextran compound per mole of iron.

Though it is possible to carry out the complexing reactions at room temperature, increased temperatures up to the vicinity of 100° C are usually used for obtaining a reasonable reaction velocity.

The complexes resulting from the complexing reactions consist — like dextran — of molecules having different sizes and the iron content of the said molecules expressed in percentage is varying.

The complexes formed by the first complexing step are as mentioned above subjected to a fractionate precipitation. Thereby first the fraction or fractions having the greatest iron content are precipitated. The said fractions are usually those having the highest average molecular weight.

In the precipitation step which is known in the art use may be made of a water-miscible organic solvent, such as acetone or lower molecular aliphatic alcohols, e.g., methanol, ethanol or propanols. In view of the fact that the fractionated precipitation will be the more complicated — and consequently more expensive to carry out — the more numerous are the fractions into which the product from the first complexing step is precipitated, it is according to the invention appropriate that the product from the first complexing step is precipitated into two fractions having different ferric contents, the fraction having the lower ferric content being used in the second complexing step.

The fractionated precipitation may be controlled by varying the ratio between solvent and precipitant. Consequently, it is possible according to one's desire to carry out the precipitation so that the last isolated fraction will be big and have a relatively small iron content, and the first isolated fraction will be small and have a relatively high iron content.

The ferric content of the iron dextran complex used as dextran starting material in the second complexing step may vary within large limits. Thus, it is on one hand possible to use a complex with a ferric content being as low as e.g., 0.1 percent by weight, and on the other hand also possible to use an iron dextran complex having an iron content as high as e.g., 22 percent by weight.

According to the invention it is appropriate to use as iron dextran complex in the second complexing step a fraction having an iron content of 0.3 to 3 percent by weight.

Hereby is obtained that the fraction to go on in the process will be large enough to secure that a high yield of the complex of ferric hydroxide with the dextran compound with a high iron content will be obtained while obtaining at the same time the economic advantage that the fraction or fractions first precipitated in the fractionated precipitation, being that or those having the greatest iron content, can also be used for preparing iron dextran preparations though with less iron content, such as solutions containing about 5 to 7.5 percent of iron. The average molecular weight of the said fractions should not be so high that iron preparations produced therefrom will be too viscous, which could make them inapplicable in practice.

Further, it is appropriate according to the invention that the product from the first complexing step is purified prior to the fractionated precipitation. Thereby it is better ensured that the final product will have the desired low toxicity and besides that the fraction or fractions having the highest iron content will be purified.

By the said purification the electrolytic constituents will be removed, first of all ferric ions. This also applies to the purification after the second complexing step. Both of these purifications may be carried out e.g., by dialysis, ion exchange or one or more precipitations followed by re-dissolving.

According to the invention the second complexing step is carried out in an acid medium, since it has been found that this results in the formation of iron dextran complexes having a high iron content.

When carrying out the second complexing step in an acid medium it is according to the invention preferred to form the ferric hydroxide from an inorganic ferric salt or an organic ferric salt being strongly acid in solution, e.g., ferric trichloro acetate.

Since, as mentioned above, a complexing reaction will always result in a final product having molecules of different sizes and molecules having varying iron content so that those constituents of the product having a high molecular weight will usually have a high iron content, and since the said constituents of the product will further be first precipitated by a fractionated precipitation, it is according to the invention appropriate that the product from the second complexing step, in which a fraction from the first complexing step is used as one of the reactants instead of the dextran compound itself, is precipitated into two fractions with different iron contents, the fraction showing the lower iron content being recycled.

By the above measures a final product is obtained which has an elevated average iron content and the final yield is not very much reduced because of recycling the fraction having the lower iron content.

The said precipitation should be carried out in such a manner that the two fractions will have almost the same size.

If the fractionated precipitation after the second complexing step is carried out in such a manner that the fraction having the higher iron content will be considerably greater than the fraction having the lower iron content this will involve a reduction of the iron content in percentage in the first mentioned fraction, and solutions thereof will with the same iron concentration have an undesired high viscosity.

Further, it is appropriate according to the invention to use as starting material in the first complexing step a dextran compound which is purified and, if desired, isolated and dried. By the said measure it is better ensured that the final product will have the desired low toxicity.

It is according to the invention appropriate to carry out both of the complexing steps at a pH-value within the range of 1.1 to 2.3. Preferably a pH-value of 1.4 to 1.6 is used. Thereby higher yields of the iron dextran complex having a high iron content are obtained.

In the said embodiment a ferric salt is dissolved in water and to the said solution a solution of a base is added slowly while stirring. About 1.35 to 1.7 moles of base equivalent per mole of iron are used, whereby pH-values within the desired range of 1.1 to 2.3 are arrived at. The ratio between base and ferric compound is fixed in order to secure that the ferric hydroxide formed remains in colloidal solution, and the pH-value will not be too low or too high to enable the complexing to take place. Besides on the mole ratio between base and ferric compound the pH-value is also dependent on the concentration of the solutions.

Thereafter a solution of the dextran compound is added to the colloidal solution of the partially neutralized ferric salt at an elevated temperature, e.g., 40° to 90° C, and the complexing step is effected at the elevated temperature for a period of time ranging from 5 minutes to 2 hours.

Then the complex formed is purified by means of one of the above mentioned purification methods so that the pH-value of the solution will be between 2.0 and 2.3, which means that the main part of the ferric ions has been removed.

Then autoclaving at about 110° to 120° C for 10 to 60 minutes is carried out, which causes the dextran to depolymerize somewhat. The said autoclaving is important for obtaining a satisfactory final product.

After autoclaving and cooling a base, preferably a sodium hydroxide solution, is added until the pH-value is at least 10 whereafter autoclaving at 120° C for 10 to 60 minutes is again carried out. This causes the last remainders of unreacted ferric ions to be complexed. After cooling the pH-value is adjusted to about 6.0 with hydrochloric acid, whereafter the product is precipitated into two fractions showing different iron contents. Both fractions are dried, e.g., in a vacuum unit at about 60° to 70° C. The fraction having the lower iron content is brought back to the process while the other fraction can be used for preparing injectable iron dextran solutions.

When carrying out the process according to the said embodiment it is according to the invention appropriate to use as dextran compound a compound having an intrinsic viscosity of 0.08 to 0.12. Hereby complexes are obtained which in solutions have a viscosity suitable for injection.

The complex from the second complexing step can, after it has been isolated, be brought directly into solution in a suitable, pharmacologically acceptable solvent.

Water is used as solvent. Prior to being used as a therapeutic preparation the said solution should be made isotonic with the blood fluids. This may be done in a manner known per se. The pH-value of the finished solution should be within the range of 5.5 to 8.5, and preferably solutions having a pH-value of 6.7 to 7.5 are produced.

The product from the second complexing step may also be isolated by precipitation and subsequent drying. The resultant solid iron dextran complexes may immediately be dissolved in distilled water for use in the production of therapeutically applicable, injectable solutions of the iron dextran complex.

When such a solution has been prepared it may be sterilized prior to being poured into the final containers, or it may e.g., be poured into ampoules and then sterilized. When sterilization is carried out before the solution is poured into the final containers it is appropriate — with a view to securing the sterility of the solution— to add a preserving agent.

The said iron dextran complexes cannot only be used in the treatment of anaemia in animals and human beings, but also in any cases where an easily absorbable source of iron is required.

The examples given below illustrate the process according to the invention.

EXAMPLE 1 a. To 500 ml of an aqueous ferric chloride solution being 1.75 molar as to iron, are added with vigorous stirring 500 ml of a 1.34 molar aqueous sodium carbonate solution to form a ferric hydroxide sol. To the said sol are added 720 ml of a 25 percent aqueous solution of dextran glycerol glucoside having an intrinsic viscosity of 0.18 at 25° C. This corresponds to 1.27 moles of anhydroglucose units per mole of iron. Thereafter the solution is heated to 75° C and the temperature is kept at 75° C until the pH-value of the solution has decreased to 1.1.

The resultant iron dextran glucoside complex is precipitated from the said solution by adding 1,700 ml of methanol. The supernatant liquor is discarded and the complex is dissolved again in 600 ml of water at 50° C. The said process is repeated until the solution is mainly freed of ferric ions. The solution resulting from the last solution in water is heated to 70° C for 30 minutes to remove the methanol and is then heated for 25 minutes in an autoclave at 110° C and at a pressure above the atmosphere amounting to 0.5 kg/cm$^2$. After cooling a 5 percent sodium hydroxide solution is added until the pH-value of the reaction solution is 11.3, whereafter heating for 20 minutes at 120° C at a pressure above the atmosphere amounting to 1 kg/cm$^2$ is performed.

After cooling the pH-value of the solution is adjusted to 6.0 by adding 4 N hydrochloric acid whereafter 100 percent methanol is added to obtain a methanol concentration of 36 per cent. Thereby is precipitated as a first fraction 102 g of an iron dextran glycerol glucoside complex which is isolated by decanting and dried. The precipitated product has an iron content of 27.2 percent and a dextran glucoside content of 48.5 percent.

To the decanted liquid 100 percent methanol is further added to obtain a methanol concentration of 60 percent. Thereby is precipitated as a second fraction 120.6 g of ferric dextran glucoside complex containing 2 percent of iron and 88 percent of dextran glycerol glucoside and corresponding to 67 percent of the originally used dextran glycerol glucoside. The said fraction is used as starting material in another complexing step.

26.2 g of the first precipitated fraction are dissolved in 80 ml of water. The solution is made isotonic with the blood fluids by adding NaCl. The final solution has a pH-value of 6.6, an iron content of 75 mg per ml and an LD$_{50}$-value of 830 mg of Fe/kg weight of the body assayed by intravenous injection in mice.

b. To 500 ml of an aqueous ferric nitrate solution being 1.75 molar as to iron are added while stirring 500 ml of a 2.68 molar sodium hydroxide solution to form a ferric hydroxide sol. To the said sol are added 200 g of the above mentioned iron dextran glycerol glucoside complex precipitated as the second fraction, dissolved in 650 ml of water, whereafter the solution is heated to 50° C and this temperature is kept for 45 minutes. After cooling the solution is dialysed with ion-echanged water for about 24 hours, whereafter it is heated in a sealed autoclave for 15 minutes at 110° C. The solution is cooled again and its pH-value adjusted to 10.8 by adding a 5 percent sodium hydroxide solution whereafter heating in a sealed autoclave for 30 minutes at 120° C takes place. After cooling the pH-value is adjusted to 6.0 with 4 N hydrochloric acid.

Then 100 percent methanol is added to obtain a methanol concentration of about 39 percent. Thereby is precipitated as a first fraction 95.2 g of iron dextran glycerol glucoside complex which is isolated by decanting and dried. The dried product has an iron content of 31.5 percent and a dextran glycerol glucoside content of 45 percent.

Further 100 percent methanol is added to the decanted liquid to obtain a methanol concentration of 60 percent. Thereby is precipitated as a second fraction 110 g of iron dextran glucoside complex containing 2.5 percent of Fe and 86 percent of dextran glucoside. The yield by weight is 55 percent of the iron dextran glycerol glucoside used in the second complexing step. The said fraction is used as starting material in another complexing step. 30.1 g of the first fraction are dissolved in 80 ml of water and the solution is made isotonic with the blood fluids by adding NaCl. The resultant solution contains 100 mg of Fe per ml, has a pH-value of 6.8, a viscosity at 25° C of 13 cps and an LD$_{50}$-value of 1,150 mg of Fe/kg weight of the body assayed by intravenous injection in mice.

In the processes described above between 80 and 90 percent of the employed dextran compound are utilized.

EXAMPLE 2 a. A ferric hydroxide sol is produced by adding 500 ml of a 2.68 molar aqueous sodium hydroxide solution while stirring to 500 ml of an aqueous ferric trichloro acetate solution being 1.75 molar as to iron. Then 1,000 ml of a 18 per cent aqueous solution of dextran having an intrinsic viscosity of 0.35 at 25° C are added, and a complexing reaction as that mentioned in Example 1a is effected.

After the complexing step the solution is purified by ion exchange with a mixture of an acid and alkaline ion exchanger until the pH-value of the solution is 2.3, which indicates that the solution is mainly freed of ferric ions. Then the solution is heated in an autoclave for 30 minutes at 120° C, cooled and treated with sodium hydroxide solution, as mentioned in Example 1a. After cooling 100 percent acetone is added to obtain an acetone concentration of 33 percent. The first fraction thereby precipitated is isolated, and 143 g of iron dextran complex are obtained, said complex containing 19.1 per cent of iron and 58 percent of dextran, which corresponds to 79.4 percent by weight of the dextran originally used.

Then 100 percent acetone is further added to obtain an acetone concentration of 55 percent. The supernatant liquor is decanted whereby 63 g of iron dextran complex are obtained, said complex containing 0.1 per cent of Fe and 90.2 percent of dextran and corresponding to 35 percent by weight of the dextran originally employed.

b. 100 g of the last precipitated fraction are again subjected to the complexing reaction described in Example 1b, the ferric hydroxide sol being prepared from 230 ml of a 2.68 molar aqueous sodium hydroxide solution and 250 ml of a ferric chloride solution being 1.75 molar as to iron. After the complexing step is completed, the resultant iron dextran complex is purified and precipitated by adding 1,000 ml of acetone. The precipitated complex is isolated by decanting and dissolved in 300 ml of water and the said process is repeated until the ferric ions being present have been substantially removed.

After purification there is proceeded in the manner described in Example 1b, the fractionated precipitation being carried out by adding 100 percent acetone to arrive at an acetone concentration of 34 percent followed by a further addition of acetone to attain an acetone concentration of 55 percent. The precipitated fractions are isolated and dried. 49.5 g of an iron dextran complex containing 30.3 percent of Fe and 43 percent of dextran reckoned on the weight of the dried product are obtained as a first fraction and as a second fraction 52 g of an iron dextran complex containing 2.5 percent of Fe and 87 percent of dextran reckoned on the weight of the dried product. The yield by weight of the two fractions is 49.5 percent and 52 percent, respectively, of the employed ferric dextran.

From the first fraction a solution is prepared as described in Example 1b, said solution containing 8 percent of Fe and having a viscosity of 10 cps at 25° C and an $LD_{50}$-value of 890 mg of Fe/kg weight of the body assayed by intravenous injection in mice.

In the processes described above 70 to 75 percent of the employed amount of the dextran compound are utilized since only 100 g of dextran were employed. On industrial scale the utilization would have been better.

EXAMPLE 3 a. The first complexing step takes place in the same manner as described in Example 1a, use, however, being made of 200 g of dextran glycerol glucoside having an intrinsic viscosity of 0.08 at 25° C.

After the complexing step the resultant iron dextran glycerol glucoside complex is precipitated by adding 2,000 ml of propanol-2 and the precipitated product is isolated by decanting and dissolved in 600 ml of water. The said measure is repeated until excess of ferric ions has been substantially removed. After the last precipitation and filtering the product is dissolved in 1,200 ml of water and heated in a sealed autoclave for 10 minutes at 110° C whereafter there is proceeded as described in Example 1a, with the exception, however, that the fractionated precipitation takes place at a propanol concentration of 35 percent in precipitating the first fraction and a propanol concentration of 55 percent in precipitating the second fraction.

Thereby are obtained as the second fraction 90 g of iron dextran glucoside complex, containing 1.3 percent of Fe and 91 percent of dextran glucoside and corresponding to 45 percent of the employed dextran glucoside.

b. 90 g of the said fraction are used as starting material in a second complexing step carried out as described in Example 1a, and after the complexing step the excess of ferric ions is removed by dialysis. Then the procedure described in Example 1b is followed with the modification that the fractionated precipitation is carried out in a concentration of 36 percent and then in a concentration of 60 percent. The precipitated fractions are isolated and dried.

The first fraction amounts to 40.5 g of an iron dextran glucoside complex containing on the basis of the dry weight 30.5 percent of Fe and 44 percent of dextran glucoside, and from this product there is prepared in the manner described in Example 1b a solution containing 100 mg of Fe per ml and having a viscosity at 25° C of 14 cps and an $LD_{50}$-value of 890 mg of Fe/kg weight of the body assayed by intravenous injection in mice.

EXAMPLE 4

To 500 ml of a ferric hydroxide sol prepared as described in Example 1b are added 385 g of a complex of ferric hydroxide with dextran, said complex containing 22 percent of Fe and 55 percent of dextran, and having been prepared by the process described in Example 3a (1a). The amount of iron dextran used corresponds to 880 g per mole of iron in the ferric hydroxide sol.

In other respects there is proceeded as described in Example 1b, except, however, that the fractionated precipitation is carried out by adding acetone. In order to precipitate the first fraction 100 percent acetone is used to obtain an acetone concentration of 34 percent.

After drying 244 g of an iron dextran complex are obtained containing 32.7 per cent of Fe and 43 per cent of dextran. Therefrom is prepared exactly in the manner described in Example 1b a solution containing 8 percent of Fe and having a viscosity at 25° C of 9 cps and an $LD_{50}$-value of 1,020 mg of Fe/kg of the body, assayed by intravenous injection in mice.

EXAMPLE 5 a. The first complexing step takes place in the same manner as described in Example 3a.

b. 90 g of iron dextran glycerol glucoside complex containing 1.3% of Fe obtained as the second fraction in Example 3a are used as starting material in a second complexing step carried out as follows:

To 250 ml of an aqueous ferric chloride solution being 1.75 molar as to iron at 50° C are added with vigorous stirring 250 ml of a 1.34 molar aqueous sodium carbonate solution at 50° C to form a ferric hydroxide sol. To the said sol are added the 90 g iron dextran glycerol glucoside complex dissolved in 300 ml distilled water at 80° C. The temperature of the solution is kept at 65° C for 35 minutes.

The resulting iron dextran glucoside complex is precipitated from the said solution by adding 1,250 ml 87 percent isopropanol. The complex is freed of ferric ions by repeated precipitations with 87 percent isopropanol and thereafter is dissolved in 300 ml distilled water. The solution is heated for 20 minutes in an autoclave at 110° C. After cooling a 5 percent sodium hydroxide solution is added until the pH-value of the solution is 11.3, whereafter heating for 20 minutes at 120° C in an autoclave takes place.

After cooling the pH-value of the solution is adjusted to 6.8 by adding 4 N hydrochloric acid whereafter 87 percent isopropanol is added to obtain a final isopropanol concentration of 35 percent. The precipitated iron dextran glycerol glucoside is redissolved in 300 ml distilled water and reprecipitated with 87 percent isopropanol to obtain a final isopropanol concentration of 32 percent. Thereby is precipitated an iron dextran glucoside complex which is isolated by centrifugation. The analysis of the dried product shows as follows:

| | |
|---|---|
| Iron contents: | 41.5% |
| Dextran glucoside: | 21.3% |
| Moles iron per anhydro-glucose unit: | 5.66 Fe/anhydroglucose |
| $H_2O$: | 2.1% |
| Intrinsic viscosity: | 0.07 |
| Contents Dextran/Contents Fe: | 0.51 |

28.6 g of this iron dextran glucoside complex are dissolved in 90 ml distilled water. The solution is made isotonic with the blood fluids by adding NaCl. The final solution has a pH-value of 7.0, an iron content of 120 mg per ml, a viscosity at 25° C of 15 cps, and an $LD_{50}$-value of 1,050 mg of Fe/kg weight of the body assayed by intravenous injection in mice.

EXAMPLE 6 a. The first complexing step takes place in the same manner as described in Example 1a, but the amounts used are up-scaled 100 times.

b. 7.2 kg of ferric dextran glucoside complex containing 2 per cent of iron and 88 percent of dextran glucoside obtained as the second fraction in the above mentioned Example are used as starting material in the second complexing step carried out as follows:

To 20 liters of an aqueous solution containing 9.4 kg of ferric chloride hexahydrate at 45° C are added with vigorous stirring 20 liters of an aqueous solution containing 3.6 kg of anhydrous sodium carbonate at 45° C to form a ferric hydroxide sol stabilized by excess of chloride ions. To the said sol 7.2 kg of ferric dextran glucoside complex dissolved in 30 liters of deionized water at 85° C are added. The temperature of the solution is kept at 60° C for 30 minutes.

The resulting iron dextran glucoside complex is freed of ferric ions by repeated precipitations with 99 percent isopropanol and thereafter dissolved in 30 liters of deionized water. The solution after evaporation of the isopropanol residue is heated in an autoclave for 20 minutes at 100° C. plus 15 minutes at 110° C.

After cooling to 50° C a 10 percent sodium hydroxide solution is added until the pH-value of the solution is 11.0, whereafter heating for 15 minutes at 120° C takes place.

After cooling to 60° C the pH-value of the solution is adjusted to pH 6.5 with hydrochloric acid, whereafter 99 percent isopropanol is added to obtain a final isopropanol concentration of 36 percent.

The precipitated iron dextran glucoside complex is redissolved in 30 liters of distilled water and precipitated fractionally with 87 percent isopropanol to obtain a final isopropanol concentration of 33 percent. The precipitated iron dextran glucoside is isolated by centrifugation in a Super Centrifuge, redissolved in 25 liters distilled water and spray-dried. A total amount of 4.0 kg dry powder is obtained the analysis of which shows as follows:

| | |
|---|---|
| Iron contents: | 37.8 percent |
| Dextran glucoside: | 27.3 percent |
| $H_2O$: | 2.5 percent |
| Moles iron per anhydro-glucose unit: | 4.03 Fe/anhydroglucose |
| Intrinsic viscosity at 25° C: | 0.06 |
| Ratio dextran/iron: | 0.72 |

With the dry powder an isotonic solution is made with an iron content of 100 mg per ml, a viscosity at 25° C of 8 cps and an $LD_{50}$-value of 1,200 mg of Fe/kg body weight when assayed by intravenous injection in mice.

The eluate of the centrifuge containing the iron dextran glucoside with low iron content is precipitated with 99 per cent isopropanol to a final concentration of 60 percent isopropanol. After drying 5.8 kg of ferric dextran glucoside complex containing 2.9 percent of iron and 85 percent of dextran glucoside are obtained. This is a recovery of 95 percent based upon the initial dextran glucoside.

In the process of the present invention the loss of dextran compound is considerably lower than in the processes known in the art. In Examples 1a, 1b and 2a the dextran glucoside loss is only between 10 and 20 percent. In Example 2b the loss is a little higher due to the fact that the process is carried out on a very small scale, only using 100 g of dextran glucoside in the complexing procedure. When carrying out the process of the invention on an industrial scale the loss of dextran compound is less than 10 percent, vide example 6.

In Example 3 of the U.S. Reissue Pat. specification, No. 24,642 there are used 400 g of dextran as starting material whereas the final product 600 ml liquid contains 5 percent of Fe. Nothing is said about the dextran content in the final product, but in the specification it is said in col. 3, lines 39 to 40 that a preparation containing 5 percent of Fe will contain 30 to 50 percent of dextran. If the preparation contains 30 percent of dextran the 600 ml liquid will contain 180 g of dextran corresponding to a dextran loss of 55 percent. If the preparation contains 50 percent of dextran the 600 ml liquid will contain 300 g of dextran corresponding to a dextran loss of 25 percent.

It must be considered that preparations containing 5 percent of Fe and 30 percent of dextran in the solution will contain about 12.5 percent of Fe and 75 percent of dextran in dry state while preparations containing 5 percent of Fe and 50 percent of dextran in the solution will contain about 9 percent of Fe and 80 percent of dextran in dry state. Of these large amounts of dextran only a small fraction is complexed to iron. The rest of the dextran (as much as 80 percent) is unbound and could have been utilized for complexing more iron. In the Example of the Swiss Pat. specification, No. 370,194 the starting materials are 50 g of polyisomaltose and 80 ml of an aqueous solution containing 30 percent by weight of $FeCl_3,6H_2O$, which is equal to 5 g of Fe. The final product is an iron/polyisomaltose complex containing 33.4 percent of Fe. If it is supposed that all the 5 g of Fe were complexed to the polyisomaltose, which is the most favorable condition for the reaction, and because of the fact that the final product according to the indications in the specification, vide page 2, lines 2 to 6, shows the ratio 2 moles of Fe to each anhydroglucose unit of the polyisomaltose, the following amount of polyisomaltose was complexed to iron:

$$5 \times 162/2 \times 55.8 = 7.3 \text{ g of polyisomaltose}$$

This means that 50 g minus 7.3 g = 42.7 g of polyisomaltose have not been complexed. The loss of polyisomaltose is thus more than 80 percent.

In the Example of U.S. Pat. specification, No. 2,885,393 the loss of dextran is about 60 percent. In the Example there are used 90 g of dextran and the final product is 82 g of the iron dextran complex containing 24 percent of Fe, which means OH-groups = about 20 percent. The content of dextran may be calculated as follows: 100 minus 24 minus 20 = 56 percent. The 82 g of iron dextran complex thus contain 56 × 82/100 = 46 g of dextran and this corresponds to a dextran loss of about 60 percent.

The above comparison shows that in our process it is possible to obtain higher Fe content in the iron dextran complex and that the loss of dextran compound is considerably lower in our process than in the known processes referred to above.

The purpose of making iron dextran complex is to bring iron into a non-toxic form and to make it available to the organism by injection. The purpose of the production of iron dextran complexes is not to supply the body with dextran. This means that it constitutes an improvement in the art to make available to the public an iron dextran complex preparation with a high iron content and a low dextran content.

What we claim is:

1. In a process of producing complexes of ferric hydroxide and a dextran compound having an intrinsic viscosity within the range of 0.025 and 0.75 at 25° C and selected from the group consisting of dextran and dextran glucosides, the improvement wherein the complexing reaction is carried out in two steps and wherein a fraction of the complex from the first complexing step is used in the second complexing step.

2. The method of increasing the iron content of iron dextran complexes which comprises reacting an iron dextran complex in an aqueous medium under acid conditions with a formed in situ ferric hydroxide sol and thereafter precipitating less than about one half the iron dextran complex from the reaction mass and separating and recovering the fraction precipitated.

3. The method according to claim 2 wherein a second fraction is precipitated, separated and recycled.

4. The process for producing iron dextran complexes which comprises a first complexing step in which ferric hydroxide is reacted under aqueous acid conditions with a dextran compound having an intrinsic viscosity of 0.025 to 0.75 at 25° C and selected from the group dextran and dextran glucosides, precipitating the iron dextran complex into at least two fractions having different iron contents, subjecting one of the fractions of the iron dextran complex formed in the first complexing step to a second complexing step and wherein said iron dextran complex is reacted under aqueous acid conditions with ferric hydroxide, precipitating the iron dextran contained in the reaction mass into at least two fractions having different iron contents, separating and recovering the fraction having the higher iron content and recycling the fraction having the lower iron content.

5. A process according to claim 4 wherein the fraction of the iron dextran complex formed in the first complexing step that is subjected to the second complexing step is the fraction having the lower iron content.

6. A process according to claim 4 wherein both of the complexing steps are carried out at a pH of 1.1 to 2.3.

7. A process according to claim 4 wherein unreacted ferric ions are removed from the complex produced in the first complexing step before it is subjected to the second complexing step.

8. A process according to claim 4 wherein an aqueous alkaline solution of the iron dextran complex from the first or second complexing steps is autoclaved, cooled and acidified before fractionally precipitating the iron dextran complex.

9. A process according to claim 4 wherein an aqueous alkaline solution of the iron dextran complex from the first and second complexing steps is autoclaved, cooled and acidified before fractionally precipitating the iron dextran complex.

* * * * *